United States Patent [19]
Anderson

[11] Patent Number: 5,555,103
[45] Date of Patent: Sep. 10, 1996

[54] HALF-TONE CONVERSION MASK FOR DIGITAL IMAGES

[75] Inventor: Peter G. Anderson, Pittsford, N.Y.

[73] Assignee: Eastman Kodak Company, Rochester, N.Y.

[21] Appl. No.: 852,459

[22] Filed: Mar. 16, 1992

[51] Int. Cl.$^6$ .............................. H04N 1/40; H04N 1/46
[52] U.S. Cl. .................. 358/456; 358/534; 358/535; 358/536; 358/537; 358/538
[58] Field of Search ................................. 358/534, 535, 358/536, 537, 538, 456

[56] References Cited

U.S. PATENT DOCUMENTS 4,910,603 3/1990 Hirahara ................................. 358/298

OTHER PUBLICATIONS

The Divine Proportion by H. E. Huntley, Dover Publication.

Primary Examiner—Sandra L. O'Shea
Assistant Examiner—John Ning
Attorney, Agent, or Firm—Raymond L. Owens

[57] ABSTRACT

A half-tone mask is characterized by an N×M array of mask value locations associated with at least a portion of the pixels of the digital image. The size of the mask array may contain a relatively small number of pixel locations, which is applied spatially to mutually contiguous subsets or sub-arrays of pixels of a relatively high resolution digital image. Although the mask may also be made large enough to encompass the entire image of interest, respective threshold values of the mask may be computed 'on the fly', so as to obviate the need to prestore all of the threshold values of the mask. Each of the locations of the mask array is assigned a respectively different grey scale/half-tone conversion threshold value. These threshold values are distributed among the locations of the mask array such that as one proceeds through the mask array, the next sequential location is specified in accordance with fractional parts of integral multiples of a two-dimensional analog of the Golden Mean. Each successive mask location is assigned a sequentially larger grey scale to half-tone conversion threshold. These threshold values are successive integers 0 through K, where K is one less than M×N. The use of a two-dimensional analog of the Golden Mean to algebraically distribute the threshold values disperses successive threshold value integers, so that any half-tone image obtained by the mask is not contaminated with low-frequency, visually disturbing artifacts.

22 Claims, 1 Drawing Sheet

| 0 | 36 | 72 | 108 | 27 | 63 | 99 | 18 | 54 | 90 | 9 | 45 | 81 |
|---|----|----|-----|----|----|----|----|----|----|----|----|----|
| 52 | 88 | 7 | 43 | 79 | 115 | 34 | 70 | 106 | 25 | 61 | 97 | 16 |
| 104 | 23 | 59 | 95 | 14 | 50 | 86 | 5 | 41 | 77 | 113 | 32 | 68 |
| 39 | 75 | 111 | 30 | 66 | 102 | 21 | 57 | 93 | 12 | 48 | 84 | 3 |
| 91 | 10 | 46 | 82 | 1 | 37 | 73 | 109 | 28 | 64 | 100 | 19 | 55 |
| 26 | 62 | 98 | 17 | 53 | 89 | 8 | 44 | 80 | 116 | 35 | 71 | 107 |
| 78 | 114 | 33 | 69 | 105 | 24 | 60 | 96 | 15 | 51 | 87 | 6 | 42 |
| 13 | 49 | 85 | 4 | 40 | 76 | 112 | 31 | 67 | 103 | 22 | 58 | 94 |
| 65 | 101 | 20 | 56 | 92 | 11 | 47 | 83 | 2 | 38 | 74 | 110 | 29 |

HALF-TONE CONVERSION MASK FOR DIGITAL IMAGES

FIELD OF THE INVENTION

The present invention relates in general to digital image processing systems and is particularly directed to a mechanism for generating a half-tone image mask through which the encoded grey scale values of respective pixels of a digital image are thresholded to binary values of a half-toned digital image.

BACKGROUND OF THE INVENTION

Recent improvements in their spatial and data resolution capabilities have made digital image processing systems attractive for a number of photoprocessing applications. In still image photography, for example, once an image (such as a multilevel grey scale image captured on photographic film or a high resolution digital camera) has been digitized and stored in an attendant data base, it is optimized for reproduction by a variety of reproduction devices. Unfortunately, a number of digital image output devices, such as dot matrix printers, laser printers, etc., possess only binary output capability; namely, they can print only two tone (e.g. black and white) images. As a result, in order to reproduce a continuous tone or grey scale image by way of such a device, the grey scale levels of the original digital image must be encoded or 'half-toned' into binary values (e.g. 0=black and 1=white), from which respective pixel representative signals are produced.

Because the reduced digital code resolution of the binary values constitutes a significant reduction in image content (loss of grey scale code width), the mechanism through which the half-toning of the original digital image takes place should be designed so that the binary image takes on the appearance of an image having grey scale or continuous tone qualities.

Such a half-toning mechanism may be represented spatially as 'dithering' mask M[A][B], or array of A rows and B columns, with entries in the M[i][j] array being greater than or equal to 0.0 and less than 1.0, where [i][j] denotes a pixel location. Also, [i] is greater than or equal to 0 and less than or equal to A, and [j] is greater than or equal to 0 and less than or equal to B. Respective grey scale values of a corresponding array of pixels of the original digital image are compared with entries in the mask. Depending upon whether a respective grey scale value of the digital image is larger than a threshold value of an associated matrix location of the mask, as effectively spatially superimposed upon the digital image, the grey scale value will be converted to a half-tone value of either zero or one.

Thus, when the half-toning mask M is applied to a grey scale-valued pixel of an original image, a half-toned output value H[i][j] may be defined in accordance with the mask M by the condition:

if the grey-scale value at [I][J] is greater than or equal to M[i%A][j%B], then output H[i][j]=0 (black); otherwise output H[i][j]=1 (white), where i%A denotes the remainder of the integer division i/A, and j%B denotes the remainder of the integer division j/B.

One conventionally employed half-toning mechanism employs a white noise source, such as a pseudo-random number distribution function, to establish the entries of the mask. Because the spectral power of white noise is equally strong at every frequency, the half-toned image tends to contain low frequency, visually disturbing artifacts. One proposal to solve this problem and provide a more desirable masking technique, is described by B. E. Bayer in an article entitled "An optimum method for two-level rendition of continuous-tone pictures," IEEE Int. Conf. Commun., 1:11–15 (1973). The Bayer mechanism takes advantage of the reduced sensitivity of the human visual system to very high frequency signals, by using a family of fixed half-tone masks of sizes $2^m \times 2^m$ and $2^{m+1} \times 2^m$, which employ an optimal thresholding criterion involving low spectral power at low frequencies.

Unfortunately, the generation of conventional masks is often computationally intensive and, depending upon image requirements, particularly in the case of very high resolution images (e.g. 1024×2048 pixel arrays), the masks themselves may be of such a size as to require an extraordinarily large memory space within which to store the threshold values.

SUMMARY OF THE INVENTION

In accordance with the present invention, the complexity of threshold value generation and data entry storage of conventional half-tone masks are substantially simplified by algebraically dispersing the threshold values throughout a dithering half-tone mask array in a manner that avoids the formation clusters of threshold values of nearly the same values, and also allows the threshold values to be either computed and stored for a variety of mask array sizes, or calculated 'on the fly' during the half-tone conversion of the original digital image.

Pursuant to the invention, the mask itself is characterized by an N×M array of mask value locations associated with at least a portion of the pixels of the digital image. The size of the mask array may contain a relatively small number of pixel locations, which is applied spatially to mutually contiguous subsets or sub-arrays of pixels of a relatively high resolution digital image (e.g. 1024×2048). For example, a mask array size of 9×13, 13×19, 19×28, etc., may be fed to half-tone convert mutually adjacent portions of a high spatial resolution grey scale image to a binary output image. (The dimension pairs are relatively prime elements of a third order minimum recurrence, described below.) Although the mask may also be made large enough to encompass the entire image of interest, respective threshold values of the mask may be computed 'on the fly' so as to obviate the need to prestore all of the threshold values of the mask.

Each of the locations of the mask array is assigned a respectively different grey scale/half-tone conversion threshold value. These threshold values are distributed among the locations of the mask array in accordance with a two-dimensional analog of the Golden Mean. Specifically, as one proceeds through the mask array, the next sequential location is specified in accordance with fractional parts of integral multiples of a two-dimensional analog of the Golden Mean. Each successive mask location is assigned a respectively different (sequentially larger) grey scale to half-tone conversion threshold. These threshold values are successive integers 0 through K, where K is one less than M×N−1. Advantageously, the use of a two-dimensional analog of the Golden Mean to algebraically distribute the threshold values results in a dispersion of successive threshold value integers, so that any half-tone image obtained by the mask is not contaminated with low-frequency, visually disturbing artifacts. In effect, the use of a distribution operator that effectively assigns successive mask coordinate locations in accordance with fractional parts of integral multiples of a two-dimensional analog of the Golden Mean.

In accordance with a preferred embodiment of the invention, a relatively high spatial resolution mask having a two-dimensional size of 1278×1873 has been found to both approximate one of the coordinate fractional factors of the distribution operator with very low error (the ratio 1873/1278 approximates the coordinate fractional factor to seven decimal places, i.e. the error is on the order of $3 \times 10^{-8}$), and to produce output images that have been observed by the human visual system to possess high grey level quality.

DETAILED DESCRIPTION

Figures 1, 2:
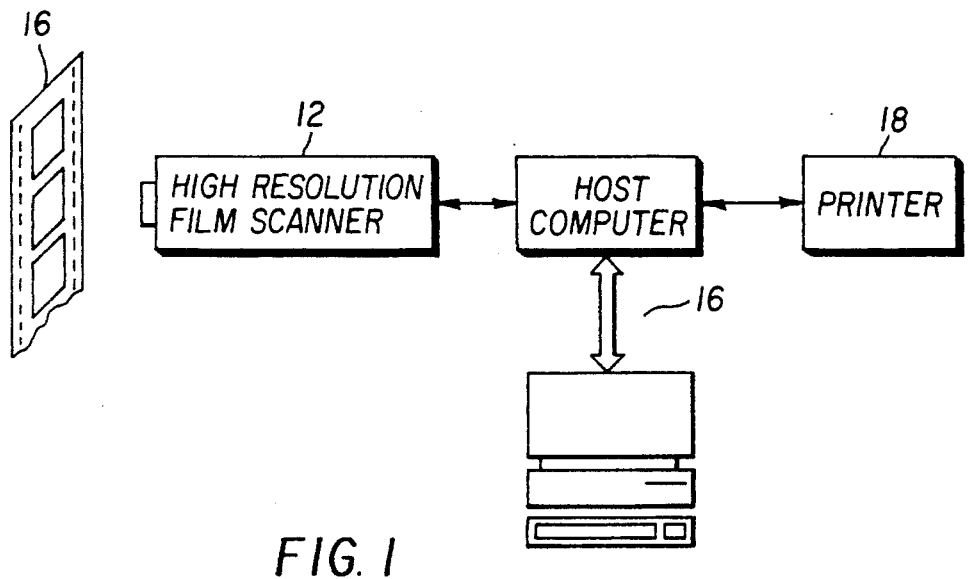
FIG. 1 diagrammatically illustrates a digitizing apparatus of the type described in U.S. patent application Ser. No. 582,305, filed Sep. 14, 1990, now U.S. Pat. No. 5,218,455, issued Jun. 8, 1993, entitled "Multiresolution Digital Imagery Photofinishing System," by S. Kristy, assigned to the assignee of the present application.
FIG. 2 diagrammatically illustrates the contents of a 13×9 embodiment of half tone mask derived by a two-dimensional application of the Golden Mean in accordance with the present invention.

Before describing in detail the improved half-tone conversion mask in accordance with the present invention, it should be observed that the present invention resides primarily in what is effectively a prescribed augmentation of the control software employed by the micro-controller within a digital image processing system, so as to permit a binary-based output device, such as a dot matrix printer, to effectively print a binary image in such a manner that the reproduced image takes on the appearance of an image having grey scale or continuous tone qualities. Consequently, the configuration of the overall system in which the mask of the present invention is employed has been illustrated in the drawings by a readily understandable block diagram, which shows only those specific details that are pertinent to the present invention, so as not to obscure the disclosure with details which will be readily apparent to those skilled in the art having the benefit of the description herein. Thus, the block diagram illustration is primarily intended to illustrate the major components of a digital image processing system in a convenient functional grouping, whereby the present invention may be more readily understood.

FIG. 1 diagrammatically illustrates a digitizing apparatus of the type described in U.S. patent application Ser. No. 582,305, filed Sep. 14, 1990, now U.S. Pat. No. 5,218,455, issued Jun. 8, 1993, entitled "Multiresolution Digital Imagery Photofinishing System," by S. Kristy, assigned to the assignee of the present application and the disclosure of which is herein incorporated. Such an apparatus may employ a high resolution opto-electronic film scanner 12, the output of which is coupled to a an image processing workstation 13 having a host digitized image processor (host computer) 14 and an associated video display terminal (VDT) 15. Scanner 12 may contain a very high resolution sensor pixel array (e.g. a 3072×2048 pixel matrix) capable of generating high spatial density-representative output signals which, when converted into digital format, yield 'digitized' photographic image files from which high quality prints may be obtained. Scanner 12 is shown as being optically coupled with a photographic recording medium, such as a 35 mm color film strip 16. Film strip 16 may contain plurality (e.g. a set of twenty-four or thirty-six) 36 mm×24 mm color image frames. For each scanned image frame, high resolution scanner 12 outputs digitally encoded data, representative of the opto-electronic response of its high resolution imaging sensor pixel array, onto which a respective photographic image frame of film strip 16 is projected by the scanner's input lens system.

This digitally encoded data, or a 'digitized' image, is supplied in the form of an imaging pixel array-representative bit map, resolved to a prescribed grey level code width (e.g. eight bits), to a host processor 14. Host processor 14 contains an image encoding and storage operator through which each high resolution digitized image file is stored. Digitized images are retrieved for reproduction by a variety of devices the resolution of which may vary from device to device, such as a digitally driven dot matrix or laser jet printer 18.

Where the digital image output device, such as dot matrix printer 18, possesses only binary output capability, a half tone, thresholding mask is used to convert the eight bit codes (which define the grey levels of the original digital image) into an array of binary values (e.g. 0=black and 1=white), from which respective pixel representative signals for driving the printer are produced. In accordance with the present invention, the mask is constructed such that its threshold values are dispersed algebraically throughout a dithering half-tone array in a manner that avoids the formation of clusters of threshold values of nearly the same values (which would tend to produce localized artifacts in the output image), and also allows the threshold values to be either computed and stored for a variety of mask array sizes, or calculated 'on the fly' during the half-tone conversion of the original digital image.

A 9×13 embodiment of half tone mask according to the present invention is diagrammatically illustrated in FIG. 2 as comprising an N=9 row×M=13 columns array of half-toning threshold values capable of being spatially associated with a two-dimensional portion or segment of the pixels of the digital (grey tone) image. For the size of the mask array of the present example, containing a relatively small number (13×9=117) of pixel locations, the mask is applied spatially to mutually contiguous subsets or sub-arrays of pixels of the high resolution digital image (e.g. 1024×2048) output by the scanner.

Each of the locations of the mask array is assigned a respectively different grey scale/half-tone conversion threshold value. These threshold values are distributed among the rows and columns of the half-tone mask array in accordance with a two-dimensional analog of the Golden Mean. Specifically, as one proceeds through the (N=9×M=13) pixel thresholding locations of the mask array, the next array location in the order of assigning sequentially increasing or incremented threshold values is specified in accordance with fractional parts of integral multiples of a two-dimensional analog of the Golden Mean, to be described more fully below. For N=8, $G_n=9$ and $G_{n+1}=13$ are two relatively prime adjacent elements of the G sequence. For the 9×13 mask array of FIG. 2, such fractional parts correspond to successive matrix increments of delta N=4, delta M=4. (The increment 4 is chosen as the difference $G_n+1-SG_n$.) Thus, beginning with the upper left hand corner of the mask array as the zeroeth coordinate location (0,0), the threshold value of (0) is assigned. Traversing the matrix in accordance with fractional parts of integral multiples of a two-dimensional analog of the Golden Mean, the next coordinate location of the mask is (4,4) to which the threshold value of (1) is assigned. Continuing through the matrix in accordance with fractional parts of integral multiples of a two-dimensional analog of the Golden Mean, the next coordinate location of the mask is (8,8) to which the threshold value of (2) is assigned. The next coordinate location is (12,12), which is modulo-translated in accordance with the size of the mask to the coordinate location (12,3) to which the next numerical value in the sequence from zero to (N×M−1) or (3) is assigned. This process is repeated until all 117 successive values of the mask have been assigned. Namely, each successive mask location is assigned a respectively different (sequentially larger) grey scale to half-tone conversion threshold. These threshold values are successive integers 0 through K, where K is one less than M×N. In practice, these numbers are to be considered scaled to interval 0–1 by division by M−1.

A close examination of the threshold value distribution within the 13×9 mask array of FIG. 2 reveals the non-clustering, dispersive property of the use of a two-dimensional application of the Golden Mean in accordance with the present invention. Among the 13 columns of the array, numerically successive values of the mask are optimally spatially spread apart from one another, so that 'clumps' of nearly equal threshold values do not occur. As an example for a sequence of values the range of which is an order of magnitude fraction of the range of the set of values of which the entire mask is comprised, for example values 0–12 out of the mask set of values 0–117, each of values 0,1,2, . . . 11,12 is associated with a respectively different column of the mask array and at a row position that effectively spatially spreads the value set. An examination of the matrix reveals that the same is true of successive sets of thirteen values of the range.

Advantageously, the use of a two-dimensional analog of the Golden Mean to algebraically distribute the threshold values yields a spatial dispersion of successive threshold value integers, so that clusters or clumps of threshold values of nearly the same value are avoided, and any half-tone image obtained by the mask is not contaminated with low-frequency, visually disturbing artifacts. In effect, the use of a distribution operator that effectively assigns successive mask coordinate locations in accordance with fractional parts of integral multiples of a two-dimensional analog of the Golden Mean results in each sequential mask value coordinate being definable in terms of an analog of the Fibonacci sequence given by $G_1=G_2=G_{-3}=1$ and $G_n=G_{n-1}+G_{n-3}$ for N>3.

As noted previously, pursuant to a preferred embodiment of the invention, a relatively high spatial resolution mask having a two-dimensional size of 1278×1873 has been found to both approximate one of the coordinate fractional factors of the distribution operator with very low error (the ratio 1873/1278 approximates the coordinate fractional factor to seven decimal places, i e the error is on the order of $3 \times 10^{-8}$) and will produce output images that have been observed by the human visual system to possess high grey level quality.

Using two adjacent, relatively prime elements in the G sequence: $G_8=9$ and $G_9=13$, the 13×9 embodiment of half tone mask diagrammatically illustrated in FIG. 2 may be derived by the use of the C-language computer code sequence set forth in Table 1, below.

TABLE 1

```
/* = g_9*/
/* = g_8*/
C = A - B;
(for(k = 0; K<A*B; k++)
{M[k*C%A][k*C%B]=k;}
```

Where run-time computation for storage space is an issue, the mask values may be calculated as a function of the pixel coordinates at the time the mask value for that coordinate is required. With reference to the mask threshold values set forth in Table 1, for the 13×9 mask of the present example, the top (zeroeth) row of the mask array consists of multiples of the column size, and the left (zeroeth) column of a mask consists of multiples of the row size. The mask takes the form of an addition table modulo A×B; i.e. M[i][j]=M[i][0] +M[0][j] modulo A×B. Thus, a considerable savings in memory is realizable by simply computing and saving the mask threshold value and saving the row zero and column zero of the mask (A+B locations instead of A×B).

However, the calculations of M[i][0] and M[0][j] may be easily carried out only as they are needed (with the opportunity also of removing calculations from nested 'for' loops to achieve run-time performance). Both row zero and column zero are the arithmetic progressions (modulo A×B):

M[0][j]=j M[0][1] M[i][0]=i M[1][0].

The two numbers, M[0][1] and M[1][0], expressed as the code constants change_on_move_right and change_on_move_down, respectively, in the C-language routine, set forth below in Table 2, may be readily determined using the Euclidean algorithm ( the gcd algorithm).

TABLE 2

```
/*constants*/
col_delta = change_on_move_right
row_delta = change_on_move_down
/*variables*/
M=0/* the mask variable*/
left_M=0/* mask value for beginning
                                        of line */
for every row in the image to be
                                        rendered
{
    M=left_M
    for every pixel in the row being
                                        processed
    {
        if(pixel_value>M)print WHITE
        else print BLACK
        M=M + col_delta
        if(M>1)M=R-1/* see note*/
    }
    left_M=left_M+row_delta
    if(left_M>1)left_M=left_M-1/*
                                        see note*/
    {
```

It should be observed that the pair of operations consisting of addition of a constant followed by the conditional 'subtract 1' can be implemented in hardware by computing two possible right-hand sides (for the first pair, these are M+col_ delta and M+(col_delta-1)) and choosing the second one, if and only if that one is positive.

The two numbers, M[0][1] and M[1][0], expressed as the code constants change_on-move-right and change_on_ move_down, respectively, in the C-language routine, set forth below in Table 2, may be readily determined using the Euclidean algorithm (the god algorithm).

TABLE 2

```
*constants*/
A = 13;
B = 9;
AB = A*B;
col_delta = change_on_move_right
row_delta = change_on_move_down
*variables*/
M=0/* the mask variable */
left M=0/* mask value for beginning
of line
for every row in the image to be rendered
{M=left_M
for every pixel in the row being processed}
```

TABLE 2-continued

```
{if (pixel_value > M) print WHITE else print
BLACK
M=M + col_delta
if (M>AB) M = M−AB}
left_M=left_M + row_delta
if (left_M>B) left_M=left_M−AB
```

It should be observed that the pair of operations consisting of addition of a constant followed by the conditional 'subtract AB' can be implemented in hardware by computing two possible right-hand sides (for the first pair, these are M+col_delta and M+(col delta-1)) and choosing the second one, if and only if that one is positive.

Rather than generate a finite mask of a fixed, and reduced number of threshold values, such as the 13×9 array of FIG. 2, which is to be applied to multiple mutually contiguous subsets of the image, an effectively 'infinite' mask may be generated using the two-dimensional analog of the Golden Mean directly. In accordance with the present invention, such a two-dimensional Golden Mean-based distribution of successive (increasing) values may be defined as:

$M[i][j]=((\alpha i+\beta j))$, where $((x))$ denotes the fractional portion of x, i.e., $((x))=x-[x]$, $\alpha$ is the unique real root of $\alpha(\alpha+1)^2=0$, and $\beta=\alpha(\alpha+1)$. $\alpha \approx 0.4656$ and $\beta \approx 0.6823$. ($\alpha$ can be rapidly approximated by Newton's iteration.)

The two-dimensional pair $(\alpha,\beta)$ is derived on the basis of an exercise in Diophantine analysis to simulate, in two dimensions, the behavior of the Golden Mean, $\tau$ in one dimension. $\tau \approx 0.618033$ satisfies the equation $\tau(\tau+1)=1$, and is the irrational number which is the most difficult to approximate by rational numbers.

The quadratic irrational $$\tau = \lim_{n \to \infty} (F_n/F_{n+1}) = \sqrt{5} - 1)/2,$$

where $F_n$ is the Fibonacci number. (The first few Fibonacci numbers are: 1, 1, 2, 3, 5, 8, 13, 21, 34, 55, 89, 144, ... ; each number in this sequence is the sum of the preceding two numbers.) The cubic irrational pair $(\alpha, \beta)$ satisfies a similar equation.

A sequence of numbers, $G_n$, may be defined using a rule similar to the Fibonacci rule: $G_{n=1}=G_n+G_{n-2}$, and starting with $G_1=G_2=G_3=1$. The first 25 numbers in this sequence are: 1, 1, 1, 2, 3, 4, 6, 9, 13, 19, 28, 41, 60, 88, 129, 189, 277, 406, 595, 872, 1278, 1873, 2745, 4023.

$$\text{Thus, } \beta = \lim_{n \to \infty} G_n/G_{n+1}$$

Other associated relationships are: $\beta^2=\alpha$ and $\beta^{-1}=\alpha+1$.

As noted earlier, in accordance with a preferred embodiment of the invention, the mask dimensions are 1278×1873; the ratio 1873/1278 approximates $\alpha+1$ to seven decimal places (i.e., the error is approximately $3\times10^{-8}$, and will produce output images that have been observed by the human visual system to possess high grey level quality. Any smaller mask's dimension's ratio is useful to only four decimal places; to improve on the above ratio requires mask sizes over 58425×85626 (the ratio 85626/58425 only reduces the error by half, yet these two parameters are not relatively prime—so even higher parameters are required).

As will be appreciated from the foregoing description, the complexity of threshold value generation and data entry storage of conventional half-tone masks are substantially simplified in accordance with the present invention, by algebraically dispersing the threshold values throughout a dithering half-tone mask array in a manner that both avoids clusters or clumping of nearly equal threshold values, and allows the threshold values to be either computed and stored for a variety of mask array sizes, or calculated 'on the fly' during the half-tone conversion of the original digital image.

Among the advantages of the present invention are its ability to be applied to masks of several different sizes, which need not be saved in any file or memory. The masks can be computed using a simple rule implemented using a very small program (or, in hardware, a small number of registers, adders, constants, and gates), which allows the mask's individual values to be computed as they are used. The subjective appearance of the rendered images is has been determined to be of high quality, being relatively free of vertical, horizontal, or 45-degree angled visual artifacts.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of generating a half-tone digital image mask for converting respective grey scale values of pixels of a digital image into one of two binary values, comprising the steps of:

(a) defining an N×M array of mask value locations associated with at least a portion of the pixels of said digital image; and (b) algebraically assigning grey scale to half-tone conversion threshold values to said mask value locations in such a manner that, in the course of sequentially proceeding through said mask value locations in an order defined in accordance with a two-dimensional analog of the Golden Mean, numerically sequential grey scale to half-tone conversion threshold values are encountered such that the grey scale values of the pixels of the digital image are converted into one of two binary values to form a half-done digital image.

2. A method according to claim 1, wherein step (b) comprises computing grey scale to half-tone conversion threshold values associated with respective ones of said mask value locations in any order.

3. A method according to claim 1, wherein step (b) comprises assigning numerically sequential grey scale to half-tone conversion threshold values to respective ones of said mask value locations, by sequentially proceeding through said mask value locations in an order defined in accordance with fractional parts of integral multiples of a two-dimensional analog of the Golden Mean.

4. A method according to claim 1, wherein step (b) comprises assigning grey scale to half-tone conversion threshold values to respective ones of said mask value locations in such a manner that, by sequentially proceeding through said mask value locations in an order defined in accordance with a two-dimensional analog of the Golden Mean, successively increasing grey scale to half-tone conversion threshold values are encountered.

5. A method according to claim 1, wherein, in the course of sequentially proceeding through said mask value locations in an order defined in accordance with fractional parts of integral multiples of a two-dimensional analog of the Golden Mean, the grey scale to half-tone conversion threshold values of respective ones of said mask value locations are successive integers 0 through K, where K is one less than M×N.

6. A method of converting a grey scale digital image into a half-tone digital image, comprising the steps of:

(a) algebraically generating a grey scale to half-tone conversion value mask having an N×M array of mask value locations associated with at least a portion of the pixels of said digital image, and assigning grey scale to half-tone conversion threshold values to said mask value locations in such a manner that, in the course of sequentially proceeding through said mask value locations in an order defined in accordance with a two-dimensional analog of the Golden Mean, numerically sequential grey scale to half-tone conversion threshold are encountered; and (b) applying the grey scale to half-tone conversion value mask generated in step (a) to said grey scale digital image, and controllably converting the grey scale value of the respective pixels of said digital image to half-tone values in accordance with a prescribed relationship between the threshold values of said mask and the grey scale values of pixels of said digital image with which respective locations of said mask are associated such that the grey scale values of the pixels of the digital image are converted into one of two binary values to form a half-tone digital image.

7. A method according to claim 5, wherein step (a) comprises computing grey scale to half-tone conversion threshold values associated with respective ones of said mask value locations in any order.

8. A method according to claim 5, wherein step (a) comprises computing a respective grey scale to half-tone conversion threshold value associated with a respective one of said mask value locations, and step (b) comprises applying the computed grey scale to half-tone conversion value to a selected pixel of said grey scale digital image, and controllably converting the grey scale value of said respective pixel of said digital image to a half-tone value in accordance with a prescribed relationship between the computed threshold value of said mask and the grey scale value of the respective pixel of said digital image.

9. A method according to claim 8, wherein steps (a) and (b) are carried out for each of the pixels of said digital image in the order that the pixels of said digital image are processed.

10. A method according to claim 6, wherein step (a) comprises generating grey scale to half-tone conversion threshold values for respective ones of said mask value locations such that, in the course of sequentially proceeding through said mask value locations in an order defined in accordance with fractional parts of integral multiples of a two-dimensional analog of the Golden Mean, numerically successive threshold values are encountered.

11. A method according to claim 6, wherein step (a) comprises generating said grey scale to half-tone conversion mask such that, in the course of sequentially proceeding through said mask value locations in an order defined in accordance with fractional parts of integral multiples of a two-dimensional analog of the Golden Mean, the grey scale to half-tone conversion threshold values of respective ones of said mask value locations are successive integers 0 through K, where K is one less than M×N.

12. A method of processing a grey scale digital image, comprising the steps of:

(a) for each respective pixel of said digital image, algebraically converting its grey scale value to a half-tone value in accordance with a prescribed relationship between said grey scale value and a threshold value of a grey scale to half-tone conversion mechanism, said mechanism being representable as an N×M array of mask values, whose array locations are spatially associatable with respective locations of at least a portion of the pixels of said digital image, each mask value being a respectively different grey scale to half-tone conversion threshold value, such that in the course of sequentially proceeding through said mask value locations in an order defined in accordance with a two-dimensional analog of the Golden Mean, numerically sequential grey scale to half-tone conversion threshold values are encountered; and (b) while applying the grey scale to half-tone conversion value mask generated in step (a) to said grey scale digital image, and controllably converting the grey scale value of the respective pixels of said digital image to half-tone values in accordance with a prescribed relationship between the threshold values of said mask and the grey scale values of pixels of said digital image with which respective locations of said mask are associated such that the grey scale values of the pixels of the digital image are converted into one of two binary values to form a half-tone image.

13. A method according to claim 12, wherein the grey scale to half-tone conversion threshold values of respective ones of said mask value locations sequentially increase in the course of sequentially proceeding through said mask value locations in an order defined in accordance with fractional parts of integral multiples of a two-dimensional analog of the Golden Mean.

14. A method according to claim 12, wherein, in the course of sequentially proceeding through said mask value locations in an order defined in accordance with fractional parts of integral multiples of a two-dimensional analog of the Golden Mean, the grey scale to half-tone conversion threshold values of respective ones of said mask value locations are successive integers of a set of integers, the range of which corresponds to the number of mask value locations of said M×N array.

15. A method according to claim 14 wherein, in the course of sequentially proceeding through said mask value locations in an order defined in accordance with fractional parts of integral multiples of a two-dimensional analog of the Golden Mean, the grey scale to half-tone conversion threshold values of respective ones of said mask value locations are successive integers 0 through K, where K is one less than M×N.

16. A method according to claim 12, wherein step (a) comprises computing grey scale to half-tone conversion threshold values associated with respective ones of said mask value locations in any order.

17. A grey scale to half-tone conversion mask for use with a digital image processing system in which, for each respective pixel of a digital image, a grey scale value is algebraically converted to a half-tone value in accordance with a prescribed relationship between the grey scale value and a threshold value, comprising an N×m array of mask values, whose array locations are spatially associatable with respective locations of at least a portion of the pixels of said digital image, each mask value being a respectively different grey scale to half-one conversion threshold value, such that in the course of sequentially proceeding through said mask value locations in an order defined in accordance with a two-dimensional analog of the Golden Mean, numerically sequential grey scale to half-tone conversion threshold values are encountered such that the grey scale values of the pixels of the digital image are converted into one of two binary values to form a half-tone digital image.

18. A mask according to claim 17, wherein the grey scale to half-tone conversion threshold values of respective ones of said mask value locations sequentially increase in the course of sequentially proceeding through said mask value locations in an order defined in accordance with fractional parts of integral multiples of a two-dimensional analog of the Golden Mean.

19. A mask according to claim 17, wherein, in the course of sequentially proceeding through said mask value locations in an order defined in accordance with fractional parts of integral multiples of a two-dimensional analog of the Golden Mean, the grey scale to half-tone conversion threshold values of respective ones of said mask value locations are successive integers of a set of integers, the range of which corresponds to the number of mask value locations of said M×N array.

20. A mask according to claim 19, wherein, in the course of sequentially proceeding through said mask value locations in an order defined in accordance with fractional parts of integral multiples of a two-dimensional analog of the Golden Mean, the grey scale to half-tone conversion threshold values of respective ones of said mask value locations are successive integers 0 through K, where K is one less than M×N.

21. A method of processing an image, comprising:

algebraically creating of half-tone conversion mask values as needed using a cubic irrational; and half-tone converting the image using the mask values as the mask values are being created.

22. A method as recited in claim 6, wherein steps (a) and (b) are performed on the fly during the conversion.

* * * * *